Jan. 2, 1951      J. B. ELIASON      2,536,359
DISTANCE AND ANGLE MEASURING INSTRUMENT
Filed May 27, 1948
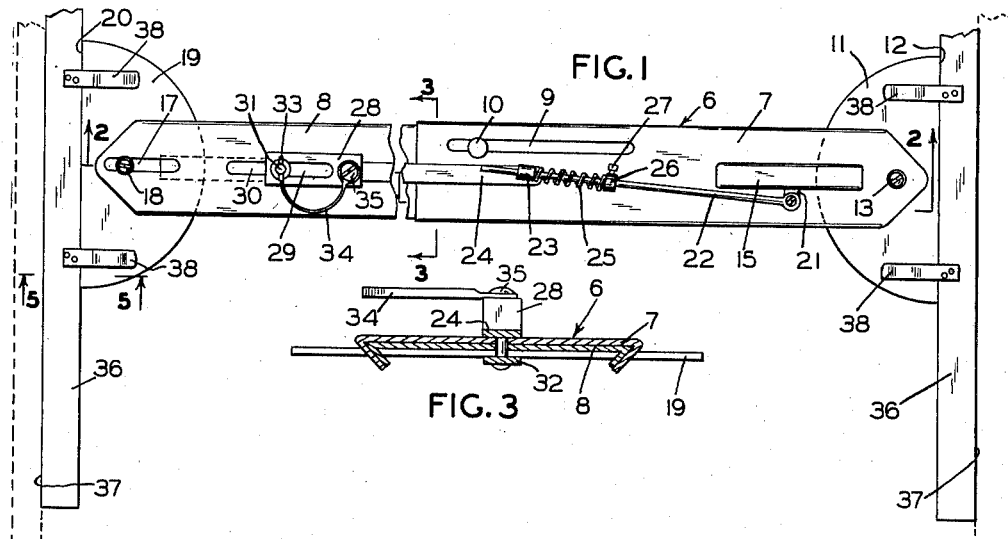
INVENTOR.
JOSEPH B. ELIASON
BY Williamson & Williamson
ATTORNEYS Patented Jan. 2, 1951

2,536,359

UNITED STATES PATENT OFFICE 2,536,359

DISTANCE AND ANGLE MEASURING INSTRUMENT

Joseph B. Eliason, Minneapolis, Minn.

Application May 27, 1948, Serial No. 29,605

3 Claims. (Cl. 33—98)

This invention relates to a measuring device and is particularly adaptable for use as a gauge by carpenters in constructing stairways, shelving and similar constructions wherein a board is to be fitted nicely between a pair of approximately parallel upright boards. While it is described for use as a carpenter's gauge, it could of course be used in building or assembling various types of construction of other materials.

It is a general object of the invention to provide a gauge which is capable of measuring the distance between a pair of spaced opposed surfaces and also determining the angles of the surfaces relative to each other in order that a piece adapted to extend between said two surfaces can be quickly and accurately measured so that it will closely fit when it is installed.

Another object of the invention is to provide a gauge of the type mentioned above which is readily adjustable for different lengths and different face angles and which can be quickly and easily set so that the gauge will hold the desired position until the proper intervening piece of material is measured and marked for cutting.

The above and other objects and advantages of the invention will more fully appear from the following description made in connection with the accompanying drawings, wherein like reference characters refer to the same parts throughout the views, and, in which:

Figure 1 is a plan view of an embodiment of the invention illustrating its relation to a pair of spaced structural members, the latter being shown in dotted lines;

Figure 2 is a section taken approximately on the line 2—2 of Figure 1;

Figure 3 is a section taken approximately on the line 3—3 of Figure 1;

Figure 4 is a bottom plan view of the main device with its straight edge extensions removed;

Figure 5 is an enlarged section taken approximately on the line 5—5 of Figure 1;

Figure 6 is a fragmentary detail of a modification; and

Figure 7 is an enlarged section taken approximately on the line 7—7 of Figure 6.

The gauge includes a main body portion 6 having a pair of complementary telescoping sections 7 and 8. The section 6 is provided with an elongated slot 9 through which a short bolt 10 extends, said bolt being threaded into the section 8 to releasably secure the two sections against relative longitudinal movement.

On the right hand end of the body 6 as viewed in Figure 1 is a semicircular straightedge member 11 having a straight edge portion 12. It is pivotally connected at 13 to the section 7 of the body 6 so that the angle of the straight edge portion 12 can be varied relative to the longitudinal axis of said body 6. Extending through the body section 7 is a shank 14 having a handle 15. The lower end of the shank 14 is provided with a cam element 16 which underlies the straightedge member 11 so that when the handle 15 is turned the cam 16 can be brought into engagement with the straightedge member 11 to clamp the latter between the cam and the underside of the body section 7.

The other end of the body 6 is provided with a slot 17. A rivet 18 extends through the slot and also through a semicircular straightedge member 19 whose straight edge 20 is disposed outwardly beyond the end of the body section 8 in the same manner that the straight edge 12 of the member 11 is disposed outwardly beyond the outer end of the body section 7.

The cam operating shank 14 is provided with a radially disposed arm 21 which is pivotally connected with a link or rod 22. This in turn extends slidably through a pivoted sleeve 23 which is mounted on one end of a link 24 on the upper side of the body 6. A compression spring 25 is interposed between the sleeve 23 and a collar 26 on the rod 22. This collar is held adjustably on the rod by means of a set screw 27.

The link 24, at its left hand end as viewed in Figures 1 and 2 has a wedge block 28 extending therefrom in alignment therewith. The wedge block 28 is provided with a longitudinal slot 29. Through the slot 29 and the slot 30 in the body section 8 a pin 31 extends. This pin is mounted on the end of a link 32 which is also connected to the rivet 18 which slidably connects the straightedge member 19 with the body section 8. The pin 31 is provided with an upper cross pin 33 which overlies the wedge block 28. A curved spring element 34 is connected between the upper end portion of the pin 31 and a stud 35 on the top of the wedge block.

This curved spring element 34 acts as a spring action aligning link between the stud 35 and the pin 31. Its purpose is to provide an outward thrust to the straightedge member 19 just prior to the actual locking of said member by the common actuator. This insures an accurate measurement of the distance between the sides of the stairway as well as an accurate measurement of the angle existent between said sides. It also serves to withdraw the straightedge member 19 from contact with the side of the staircase when the common actuator is in unlocked position.

Each of the straightedge members 11 and 19 is provided with an extension member 36 having a straight edge 37, and each of these extension members 36 is detachably secured to its respective straightedge member by means of pairs of spring clips 38 as shown in Figures 1 and 5.

In Figures 6 and 7, I have shown a device for use as an attachment and which is designed to permit the accurate checking of curved surfaces as distinguished from the angular checking means disclosed above. It includes a flexible metal strip 40 having spring clips 41 whose free ends are provided with small inwardly directed projections 42 adapted to seat in suitable apertures 43 in a straightedge member 44 which is similar to the straightedges 11 and 19 described above. The central portion of the flexible strip 40 has a tongue 45 connected thereto. This tongue is provided with a slot 46 to receive a bolt 47 which extends through the straightedge member 44 and is provided with a wing nut 48. The member 45 can be shifted longitudinally to produce different curvatures of the strip 40 as required by the work being done.

By way of example, the use of the tool will be described in connection with the building of a stairway. In dotted lines in Figure 1 I have illustrated a pair of spaced vertically disposed boards 39 which represent the side boards of a stairway structure between which the stair treds and risers extend. In order to fit the treds and risers accurately I place my gauge between them as shown in Figure 1 and extend the body sections 7 and 8 until the gauge contacts both of the boards 39. If the stair tred is relatively wide the straightedge extensions 36 are used. If the tred is of less width, the extensions 36 can be removed and the straight edges 12 and 20 of the straightedge members 11 and 19 are brought into contact with the boards 39. The set screw 10 which connects the body sections 7 and 8 is then tightened to maintain the proper length and the handle 15 is turned to cause the cam 16 to tighten against the straightedge member 11 and also to cause the wedge block 28 to wedge beneath the cross pin 33 on the vertical pin 31 and thereby tighten the straightedge member 19 so that these members will not be readily displaced from the angular position they assumed when they were fitted against the boards 39. The gauge is then removed from between the boards without loosening any of the adjusting or tightening members and the carpenter can readily mark off the exact length and end angularity of the stair tred or the riser as the case may be.

From the foregoing description it will be seen that I have provided a gauge or similar implement which greatly facilitates and speeds the accurate determination of the size and shape of a stair tred or riser so that it will closely fit between the side members of a stairway. While I have described the invention in connection with stairs construction it can be used for other purposes such as the fitting of shelves between two vertical side walls of a cabin and in any other situation where a similar type of fitting is required.

It will, of course, be understood that various changes may be made in the form, details, arrangement and proportions of the various parts without departing from the scope of my invention.

What I claim is:

1. A carpenter's gauge for determining the spacing between and relative angularity of opposed structural members comprising an extensible body, a pair of straight-edge members mounted adjacent the respective ends of said body for swinging movement relative to said body, one of said straight-edge members being also mounted for longitudinal sliding movement relative to said body, a latching means for fixing said straight edge members at set angularity relative to said body, and a reversely curved spring extending from the latching means to said slidable straight-edge member and normally urging said slidable straight-edge member outwardly from said body when said latching means approaches latching position and urging said slidable straight-edge member inwardly when said latching means approaches unlatching position.

2. A carpenter's gauge for determining the spacing between and relative angularity of opposed structural members comprising an extensible body, a pair of straight-edge members mounted adjacent the respective ends of said body for swinging movement relative to said body, one of said straight-edge members being also mounted for longitudinal sliding movement relative to said body, a common latching means for simultaneously fixing said straight-edge members at set angularity relative to said body, and a reversely curved spring extending from the latching means to said slidable straight-edge member and normally urging said slidable straight-edge member outwardly from said body when said latching means approaches latching position and urging said slidable straight-edge member inwardly when said latching means approaches unlatching position.

3. A carpenter's gauge for determining the spacing between and relative angularity of opposed structural members comprising an extensible body, a pair of straight-edge members mounted adjacent the respective ends of said body, at least one of said straight-edge members being mounted for swinging movement relative to said body and being also mounted for longitudinal sliding movement relative to said body, latching means for fixing said slidable straight-edge member at set angularity relative to said body, and a reversely curved spring extending from the latching means to said slidable straight-edge member and normally urging said slidable straight-edge member outwardly from said body when said latching means approaches latching position and urging said slidable straight-edge member inwardly when said latching means approaches unlatching position.

JOSEPH B. ELIASON.

REFERENCES CITED

The following references are of record in the file of this patent:

UNITED STATES PATENTS

| Number | Name | Date |
|---|---|---|
| 334,692 | Cutter | Jan. 19, 1886 |
| 1,601,138 | Moore | Sept. 28, 1926 |
| 1,809,401 | Cattell | June 9, 1931 |
| 1,929,371 | Hamilton | Oct. 3, 1933 |